(12) United States Patent
Pope et al.

(10) Patent No.: US 10,742,604 B2
(45) Date of Patent: *Aug. 11, 2020

(54) LOCKED DOWN NETWORK INTERFACE

(71) Applicant: Xilinx, Inc., San Jose, CA (US)

(72) Inventors: Steve L. Pope, Cambridge (GB); Derek Roberts, Cambridge (GB); David J. Riddoch, Fenstanton (GB)

(73) Assignee: Xilinx, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,371

(22) Filed: Jan. 27, 2014

(65) Prior Publication Data

US 2014/0304802 A1    Oct. 9, 2014

Related U.S. Application Data

(60) Provisional application No. 61/809,777, filed on Apr. 8, 2013.

(51) Int. Cl.
*G06F 21/00* (2013.01)
*H04L 29/06* (2006.01)
*G06Q 40/04* (2012.01)

(52) U.S. Cl.
CPC ......... *H04L 63/0245* (2013.01); *G06Q 40/04* (2013.01); *H04L 63/0263* (2013.01); *H04L 63/1416* (2013.01); *H04L 63/1441* (2013.01)

(58) Field of Classification Search
CPC .................... H04L 2012/5636; H04L 67/1012
See application file for complete search history.

(56) References Cited

U.S. PATENT DOCUMENTS

| | | |
|---|---|---|
| 5,272,599 A | 12/1993 | Koenen |
| 5,325,532 A | 6/1994 | Crosswy et al. |
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |

(Continued)

FOREIGN PATENT DOCUMENTS

| | | |
|---|---|---|
| EP | 620521 A2 | 10/1994 |
| WO | 2001048972 A1 | 7/2001 |

(Continued)

OTHER PUBLICATIONS

EP 14163938.5—Extended European Search Report dated Feb. 3, 2015, 8 pages.

(Continued)

*Primary Examiner* — Josnel Jeudy
(74) *Attorney, Agent, or Firm* — Wolf, Greenfield & Sacks, P.C.

(57) ABSTRACT

A logic device and method are provided for intercepting a data flow from a network source to a network destination. A data store holds a set of compliance rules and corresponding actions. A packet inspector is configured to inspect the intercepted data flow and identify from the data store a compliance rule associated with the inspected data flow. A packet filter is configured to, when the data flow is identified as being associated with a compliance rule, carry out an action with respect to the data flow corresponding to the compliance rule.

67 Claims, 5 Drawing Sheets

(56) References Cited

U.S. PATENT DOCUMENTS

| | | |
|---|---|---|
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,519,602 B2 | 4/2009 | Klemba et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,685,436 B2 | 3/2010 | Davis et al. |
| 7,688,853 B2 | 3/2010 | Santiago et al. |
| 7,702,629 B2 | 4/2010 | Cytron et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,890,692 B2 | 2/2011 | Pandya |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 7,996,348 B2 | 8/2011 | Pandya |
| 8,000,336 B2 | 8/2011 | Harel |
| 8,006,280 B1 | 8/2011 | Hildebrand et al. |
| 8,156,101 B2 | 4/2012 | Indeck et al. |
| 8,326,816 B2 | 12/2012 | Colle et al. |
| 8,374,986 B2 | 2/2013 | Indeck et al. |
| 8,423,789 B1 | 4/2013 | Poo et al. |
| 8,473,316 B1* | 6/2013 | Panzitta ............ G06Q 30/0234 |
| | | 705/26.81 |
| 8,789,135 B1* | 7/2014 | Pani ................... H04L 63/0209 |
| | | 370/229 |
| 9,547,824 B2 | 1/2017 | Indeck et al. |
| 10,158,377 B2 | 12/2018 | Indeck et al. |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0033588 A1 | 2/2003 | Alexander |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0117958 A1* | 6/2003 | Nation .................. H04L 47/10 |
| | | 370/235 |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0010712 A1* | 1/2004 | Hui et al. ..................... 713/201 |
| 2004/0015502 A1 | 1/2004 | Alexander et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2005/0240593 A1 | 10/2005 | D'Alo et al. |
| 2005/0276262 A1 | 12/2005 | Schuba et al. |
| 2006/0010252 A1 | 1/2006 | Miltonberger et al. |
| 2006/0026443 A1 | 2/2006 | McMahan et al. |
| 2006/0026679 A1* | 2/2006 | Zakas .................... H04L 29/06 |
| | | 726/22 |
| 2006/0045098 A1 | 3/2006 | Krause |
| 2006/0101273 A1 | 5/2006 | Tan et al. |
| 2006/0126619 A1 | 6/2006 | Teisberg et al. |
| 2006/0136570 A1 | 6/2006 | Pandya |
| 2006/0165074 A1 | 7/2006 | Modi et al. |
| 2006/0174242 A1 | 8/2006 | Zhu et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0150954 A1* | 6/2007 | Shon ................... H04L 63/1416 |
| | | 726/23 |
| 2007/0188351 A1 | 8/2007 | Brown et al. |
| 2007/0195814 A1 | 8/2007 | Barrie et al. |
| 2007/0208854 A1 | 9/2007 | Wiryaman et al. |
| 2007/0214504 A1* | 9/2007 | Milani Comparetti ...................... |
| | | H04L 63/1408 |
| | | 726/23 |
| 2007/0220183 A1 | 9/2007 | Kagan et al. |
| 2007/0237327 A1 | 10/2007 | Taylor et al. |
| 2007/0260602 A1 | 11/2007 | Taylor |
| 2007/0266431 A1 | 11/2007 | Matsuda |
| 2007/0277036 A1 | 11/2007 | Chamberlain et al. |
| 2008/0021716 A1 | 1/2008 | Buss et al. |
| 2008/0024586 A1 | 1/2008 | Barron |
| 2008/0025515 A1* | 1/2008 | Coombs ....................... 380/277 |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |

(56) References Cited

U.S. PATENT DOCUMENTS

| | | |
|---|---|---|
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2008/0310440 A1 | 12/2008 | Chen et al. |
| 2009/0060197 A1 | 3/2009 | Taylor et al. |
| 2009/0106780 A1 | 4/2009 | Nord et al. |
| 2009/0165003 A1 | 6/2009 | Jacobson et al. |
| 2009/0182683 A1 | 7/2009 | Taylor et al. |
| 2009/0201926 A1 | 8/2009 | Kagan et al. |
| 2009/0204813 A1* | 8/2009 | Kwan ........................ 713/161 |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0088437 A1 | 4/2010 | Zahavi |
| 2010/0125477 A1 | 5/2010 | Mousseau et al. |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0004771 A1* | 1/2011 | Matsushima et al. ........ 713/189 |
| 2011/0010557 A1 | 1/2011 | Kagan et al. |
| 2011/0022560 A1 | 1/2011 | Breiter et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0184844 A1 | 7/2011 | Parsons et al. |
| 2011/0196695 A1 | 8/2011 | Ye et al. |
| 2011/0202983 A1 | 8/2011 | Pope et al. |
| 2012/0016833 A1 | 1/2012 | Janiesch et al. |
| 2012/0084806 A1 | 4/2012 | Fahrny et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0131341 A1 | 5/2012 | Mane et al. |
| 2012/0201375 A1 | 8/2012 | Kisielewicz |
| 2012/0210158 A1 | 8/2012 | Akiyama et al. |
| 2012/0246052 A1 | 9/2012 | Taylor et al. |
| 2012/0246420 A1 | 9/2012 | Matsubara et al. |
| 2012/0290702 A1 | 11/2012 | Vincent |
| 2013/0000700 A1 | 1/2013 | Lee |
| 2013/0042323 A1* | 2/2013 | Narayanaswamy ........................ H04L 63/1408 726/23 |
| 2013/0047160 A1* | 2/2013 | Conover ........................ 718/1 |
| 2013/0054857 A1* | 2/2013 | Horman .................. G06F 13/24 710/260 |
| 2013/0339947 A1 | 12/2013 | Neary et al. |
| 2014/0053280 A1 | 2/2014 | Durazzo et al. |
| 2014/0115578 A1 | 4/2014 | Cooper et al. |
| 2015/0326542 A1 | 11/2015 | Serebrin |
| 2018/0375829 A1 | 9/2018 | Pope et al. |

FOREIGN PATENT DOCUMENTS

| | | |
|---|---|---|
| WO | 2002035838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Extended European Search Report for European Application No. 17187578.4 dated Jan. 5, 2018.

Adams et al., Internet X.509 Public Key Infrastructure Time Stamp Protocol (TSP). Internet Draft. PKIX Working Group. 2001. 26 pages.

Celesti et al., A Remote Attestation Approach for a Secure Virtual Machine Migration in Federated Cloud Environments. Network Cloud Computing and Applications (NCAA). 2011 First International Symposium. Nov. 21, 2011:99-106.

Ruttgen, nCipher Corporation Ltd. TM Eastern Europe. EEPE, Miedzyzdroje. Jun. 7-9, 2006. 28 pages.

European Communication for European Application No. 16160897.1 dated Aug. 10, 2017.

Extended European Search Report for European Application No. 18214201.8 dated May 17, 2019.

Jang et al., Implementation of a Hybrid TCP/IP Offload Engine Prototype. Advances in Computer Systems Architecture Lecture Notes in Computer Science. Springer. 2005;464-77.

Gordon E. Moore; "Cramming more components onto integrated circuits," Electronics, vol. 38, No. 8, 4 pages, Apr. 1, 1965.

Jack B. Dennis and Earl C. Van Horn; "Programming Semantics for Multiprogrammed Computations," Communications of the ACM, vol. 9, No. 3, pp. 143-155, Mar. 1966.

Marvin Zelkowitz; "Interrupt Driven Programming," Communications of the ACM, vol. 14, No. 6, p. 417-418, Jun. 1971.

J. Carver Hill; "Synchronizing Processors with Memory-Content-Generated Interrupts," Communications of the ACM, vol. 16, No. 6, p. 350-351, Jun. 1973.

F.F. Kuo; "The Aloha System," ACM Computer Communication Review, vol. 4, No. 1, pp. 5-8, Jan. 1974.

Vinton Cerf, Robert Kahn; "A Protocol for Packet Network Intercommunication," IEEE Transactions on Communications, vol. COM-22, No. 5, 13 pages, May 1974.

V. Cerf, et al.; "Proposal for an International End-to-End Protocol," ACM Computer Communication Review, vol. 6 No. 1, pp. 63-89, Jan. 1976.

Robert M. Metcalfe and David R. Boggs; "Ethernet: distributed packet switching for local computer networks," Communications of the ACM, vol. 19, Issue 7, pp. 395-404, Jul. 1976.

P. Kermani and L. Kleinrock; "Virtual cut-through: A new computer communciation switching technique," Computer Networks, vol. 3, No. 4, pp. 267-286, Sep. 1979.

John M. McQuillan, et al.; "An Overview of the New Routing Algorithm for the ARPANET," Proceedings of the 6th Data Communications Symposium, pp. 54-60, Nov. 1979.

Andrew D. Birrell, et al.; "Grapevine: An Exercise in Distributed Computing," Communications of the ACM, vol. 25, Issue 4, pp. 260-274, Apr. 1982.

Ian M. Leslie, et al.; "The Architecture of the Universe Network," ACM Computer Communication Review, vol. 14, No. 2, pp. 2-9, Jun. 1984.

John Nagle; "Congestion Control in IP/TCP Internetworks," ACM Computer Communication Review, vol. 14, No. 4, p. 11-17, Oct. 1984.

Robert M. Brandriff, et al.; "Development of a TCP/IP for the IBM/370," ACM Computer Communication Review, vol. 15, No. 4, pp. 2-8, Sep. 1985.

(56) References Cited

OTHER PUBLICATIONS

C. Kline; "Supercomputers on the Internet: A Case Study," ACM Computer Communication Review, vol. 17, No. 5, pp. 27-33, Aug. 1987.
Christopher A. Kent, Jeffrey C. Mogul; "Fragmentation Considered Harmful," ACM Computer Communication Review, vol. 17, No. 5, pp. 75-87, Oct. 1987.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
David R. Boggs, et al.; "Measured Capacity of an Ethernet: Myths and Reality," ACM Computer Communication Review, vol. 18, No. 4, pp. 222-234, Aug. 1988.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
V. Jacobson; "Congestion Avoidance and Control," ACM Computer Communication Review, vol. 18, No. 4, pp. 157-173, Aug. 1988.
David D. Clark; "The Design Philosophy of the DARPA Internet Protocols," ACM Computer Communication Review, vol. 18, No. 4, pp. 102-111, Aug. 1988.
Paul V. Mockapetris, Kevin J. Dunlap; "Development of the Domain Name System," ACM Computer Communication Review, vol. 18, No. 4, pp. 112-122, Aug. 1988.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
David A. Borman; "Implementing TCP/IP on a Cray computer," ACM Computer Communication Review, vol. 19, No. 2, pp. 11-15, Apr. 1989.
R. Braden, et al.; "Computing the Internet Checksum," ACM Computer Communication Review, vol. 19, No. 2, pp. 86-94, Apr. 1989.
David D. Clark, et al.; "An Analysis of TCP Processing Overhead," IEEE Communications Magazine, vol. 27, No. 6, pp. 23-29, Jun. 1989.
David R. Cheriton; "Sirpent: A High-Performance Internetworking Approach," ACM Computer Communication Review, vol. 19, No. 4, pp. 158-169, Sep. 1989.
Derek Robert McAuley; "Protocol Design for High Speed Networks," PhD Thesis, University of Cambridge, 104 pages, Sep. 1989.
Craig Partridge; "How Slow Is One Gigabit Per Second ?," ACM Computer Communication Review, vol. 20, No. 1, pp. 44-53, Jan. 1990.
D. D. Clark and D. L. Tennenhouse; "Architectural Considerations for a New Generation of Protocols," ACM Computer Communication Review, vol. 20, No. 4, pp. 200-208, Sep. 1990.
Eric C. Cooper, et al.; "Protocol Implementation on the Nectar Communication Processor," ACM Computer Communication Review, vol. 20, No. 4, 10 pages, Sep. 1990.
Bruce S. Davie; "A Host-Network Interface Architecture for ATM," ACM Computer Communication Review, vol. 21, No. 4, pp. 307-315, Sep. 1991.
C. Brendan S. Traw, et al.; "A High-Performance Host Interface for ATM Networks," ACM Computer Communication Review, vol. 21, No. 4, pp. 317-325, Sep. 1991.
Ian Leslie and Derek R. McAuley; "Fairisle: An ATM Network for the Local Area," ACM Computer Communication Review, vol. 21, No. 4, pp. 327-336, Sep. 1991.
Mark Hayter, Derek McAuley; "The Desk Area Network," ACM Operating Systems Review, vol. 25, Issue 4, pp. 1-11, Oct. 1991.
Gregory G. Finn; "An Integration of Network Communication with Workstation Architecture," ACM Computer Communication Review, vol. 21, No. 5, 12 pages, Oct. 1991.
Greg Chesson; "The Evolution of XTP," Proceedings of the Third International Conference on High Speed Networking, pp. 1-10, Nov. 1991.

Michael J. Dixon; "System support for multi-service traffic," University of Cambridge Computer Laboratory Technical Report, No. 245, pp. 1-108, Jan. 1992.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Gene Tsudik; "Message Authentication with One-Way Hash Functions," ACM Computer Communication Review, vol. 22, No. 5, pp. 29-38, Oct. 1992.
Peter Steenkiste; "Analyzing Communication Latency using the Nectar Communication Processor," ACM Computer Communication Review, vol. 22, No. 4, pp. 199-209, Oct. 1992.
Paul E. McKenney and Ken F. Dove; "Efficient Demultiplexing of Incoming TCP Packets," ACM Computer Communication Review, vol. 22, No. 4, pp. 269-279, Oct. 1992.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
C. Traw and J. Smith; "Hardware/Software organization of a high performance ATM host interface," IEEE Journal on Selected Areas in Communications, pp. 1-22, Feb. 1993.
E. Ruetsche; "The Architecture of Gb/s Multimedia Protocol Adapter," ACM Computer Communication Review, vol. 23, No. 3, pp. 59-68, Jul. 1993.
Jonathan M. Smith and C. Brendan S. Traw; "Giving Applications Access to Gb/s Networking," IEEE Network, vol. 7, Issue 4, 14 pages, Jul. 1993.
Jeffrey R. Michel; "The Design and Evaluation of an Off-Host Communications Protocol Architecture," MSci Thesis, University of Virginia, 144 pages, Aug. 1993.
Mark David Hayter; "A Workstation Architecture to Support Multimedia," PhD Thesis, University of Cambridge, 111 pages, Sep. 1993.
Jonathan Kay and Joseph Pasquale; "The Importance of Non-Data Touching Processing Overheads in TCP/IP," ACM Computer Communication Review, vol. 23, No. 4, 10 pages, Oct. 1993.
W. E. Leland, et al.; "On the Self-Similar Nature of Ethernet Traffic," ACM Computer Communication Review, vol. 23, No. 4, pp. 183-193, Oct. 1993.
C. A. Thekkath, et al.; "Implementing Network Protocols at User Level," ACM Computer Communication Review, vol. 23, No. 4, pp. 64-132, Oct. 1993.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Matthias Kaiserswerth; "The Parallel Protocol Engine," IEEE/ACM Transactions in Networking vol. 1, Issue 6, pp. 650-663, Dec. 1993.
Chris Maeda, Brian Bershad; "Protocol Service Decomposition for High-Performance Networking," ACM Operating Systems Review, vol. 27, Issue 5, 12 pages, Dec. 1993.
Greg Regnier, et al.; ETA: Experience with an Intel Xeon Processor as a Packet Processing EngineIEEE Micro, vol. 24, No. 1, pp. 24-31, Jan. 1994.
J. Vis; "A Simple LAN Performance Measure," ACM Computer Communication Review, vol. 24, No. 1, pp. 7-11, Jan. 1994.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Stuart Wray, et al.; "The Medusa Applications Environment," Proceedings of the International Conference on Multimedia Computing and Systems, Boston, MA, 9 pages, May 1994.
Various forum members; "MPI: A Message-Passing Interface Standard," Message-Passing Interface Forum, University of Tennessee, Knoxville, 236 pages, May 5, 1994.

(56) References Cited

OTHER PUBLICATIONS

Raj K. Singh, et al.; "A Programmable Network Interface for a Message-Based Multicomputer," ACM Computer Communication Review, vol. 24, No. 3, pp. 8-17, Jul. 1994.
P. Druschel, et al.; "Experiences with a High-Speed Network Adaptor: A Software Perspective," ACM Computer Communication Review, vol. 24, No. 4, pp. 2-13, Oct. 1994.
Sally Floyd; "TCP and Explicit Congestion Notification," ACM Computer Communication Review, vol. 24, No. 5, p. 8-23, Oct. 1994.
A. Edwards, et al.; "User-Space Protocols Deliver High Performance to Applications on a Low-Cost Gb/s LAN," ACM Computer Communication Review, vol. 24, No. 4, pp. 14-23, Oct. 1994.
L. S. Brakmo, et al.; "TCP Vegas: New Techniques for Congestion Detection and Avoidance," ACM Computer Communication Review, vol. 24, No. 4, pp. 24-35, Oct. 1994.
A. Romanow and S. Floyd; "The Dynamics of TCP Traffic over ATM Networks," ACM Computer Communication Review, vol. 24, No. 4, pp. 79-88, Oct. 1994.
R. J. Black, I. Leslie, and D. McAuley; "Experiences of Building an ATM Switch for the Local Area," ACM Computer Communication Review, vol. 24, No. 4, pp. 158-167, Oct. 1994.
Babak Falsafi, et al.; "Application-Specific Protocols for User-Level Shared Memory," Proceedings of the 1994 conference on Supercomputing, pp. 380-389, Washington D.C.; Nov. 14, 1994.
Mengjou Lin, et al.; "Performance of High-Speed Network I/O Subsystems: Case Study of a Fibre Channel Network," Proceedings of the 1994 conference on Supercomputing, Washington, D.C.; pp. 174-183, Nov. 14, 1994.
Nanette J. Boden, et al.; "Myrinet: A Gigabit-per-Second Local-Area Network," Draft of paper published in IEEE Micro, vol. 15, No. 1, pp. 1-15, Nov. 16, 1994.
Thomas Sterling, et al.; "Beowolf: A Parallel Workstation for Scientific Computation," Proceedings of the 24th International Conference on Parallel Processing, pp. 1-4, Aug. 1995.
K. Kleinpaste, P. Steenkiste, B. Zill; "Software Support for Outboard Buffering and Checksumming," ACM Computer Communication Review, vol. 25, No. 4, pp. 87-98, Oct. 1995.
C. Partridge, J. Hughes, J. Stone; "Performance of Checksums and CRCS over Real Data," ACM Computer Communication Review, vol. 25, No. 4, pp. 68-76, Oct. 1995.
A. Edwards, S. Muir; "Experiences Implementing a High-Performance TCP in User-Space," ACM Computer Communication Review, vol. 25, No. 4, pp. 196-205, Oct. 1995.
J. C. Mogul; "The Case for Persistent-Connection HTTP," ACM Computer Communication Review, vol. 25, No. 4, pp. 299-313, Oct. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
D. L. Tennenhouse, D. J. Wetherall; "Towards an Active Network Architecture," ACM Computer Communication Review, vol. 26, No. 2, pp. 5-18, Apr. 1996.
Paul Ronald Barham; "Devices in a Multi-Service Operating System," PhD Thesis, University of Cambridge, 142 pages, Jul. 1996.
Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
O. Angin, et al.; "Report on the 5th IFIP Internation Workshop on Quality of Service (IWQOS 97)," ACM Computer Communication Review, vol. 27, No. 3, pp. 100-117, Jul. 1997.
Charles P. Thacker and Lawrence C. Stewart; "Firefly: a Multiprocessor Workstation," ACM Operating Systems Review, vol. 21, Issue 4, pp. 164-172, Oct. 1987.

Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Parry Husbands and James C. Hoe; "MPI-StarT: Delivering Network Performance to Numerical Applications,". Proceedings of the 1998 ACM/IEEE conference on Supercomputing, Orlando, Florida, 15 pages, Nov. 7, 1998.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
S. L. Pope, et al.; "Enhancing Distributed Systems with Low-Latency Networking," Parallel and Distributed Computing and Networks, Brisbane, Australia, pp. 1-12, Dec. 1998.
M. de Vivo, et al.; "Internet Vulnerabilities Related to TCP/IP and T/TCP," ACM Computer Communication Review, vol. 29, No. 1, pp. 81-85, Jan. 1999.
M. Allman; "TCP Byte Counting Refinements," ACM Computer Communication Review, vol. 29, No. 3, pp. 14-22, Jul. 1999.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Jonathan Stone, Craig Partridge; "When the CRC and TCP Checksum Disagree," ACM Computer Communication Review, vol. 30, No. 4, 11 pages, Oct. 2000.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Ian Pratt and Keir Fraser; "Arsenic: A User-Accessible Gigabit Ethernet Interface," Proceedings of IEEE Infocom 2001, pp. 1-11; Apr. 22, 2001.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Bruce Lowekamp, et al.; "Topology Discovery for Large Ethernet Networks," ACM Computer Communication Review, vol. 31, No. 4, pp. 237-248, Oct. 2001.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
Robert Ross, et al.; "A Case Study in Application I/O on Linux Clusters," Proceedings of the 2001 ACM/IEEE conference on Supercomputing, Denver, CO, 17 pages, Nov. 10, 2001.
E. Blanton and M. Allman; "On Making TCP More Robust to Packet Reordering," ACM Computer Communication Review, vol. 32, No. 1, pp. 20-30, Jan. 2002.

(56) References Cited

OTHER PUBLICATIONS

Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Jon Crowcroft, Derek McAuley; "ATM: A Retrospective on Systems Legacy," ACM Computer Communication Review, vol. 32, No. 5, pp. 11-21, Nov. 2002.
Charles Kalmanek; "A Retrospective View of ATM," ACM Computer Communication Review, vol. 32, No. 5, pp. 13-19, Nov. 2002.
Jonathan Smith; "The Influence of ATM on Operating Systems," ACM Computer Communication Review, vol. 32, No. 5, pp. 29-37, Nov. 2002.
NR Adiga, et al.; "An Overview of the BlueGene/L Supercomputer," Proceedings of the 2002 ACM/IEEE conference on Supercomputing, pp. 1-22, Baltimore; Nov. 16, 2002.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
R. Bush, D. Meyer; "Some Internet Architectural Guidelines and Philosophy," IETF Network Working Group, Request for Comments: 3439, pp. 1-25, Dec. 2002.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Tom Kelly; "Scalable TCP: Improving Performance in Highspeed Wide Area Networks," ACM Computer Communication Review, vol. 33, No. 2, pp. 83-91, Apr. 2003.
Jeffrey C. Mogul; "TCP offload is a dumb idea whose time has come," Proceedings of HotOS IX: The 9th Workshop on Hot Topics in Operating Systems, pp. 26-30, May 18, 2003.
Derek McAuley, Rolf Neugebauer; "A case for Virtual Channel Processors," Proceedings of the ACM SIGCOMM 2003 Workshops, pp. 237-242, Aug. 2003.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
Vinay Aggarwal, et al.; "Workshop on network-I/O convergence: experience, lessons, implications (NICELI)," ACM Computer Communication Review, vol. 33, No. 5, pp. 75-80, Oct. 2003.
Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona, 13 pages, Nov. 15, 2003.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Cheng Jin, et al.; "FAST TCP: Motivation, Architecture, Algorithms, Performance," Proceedings of IEEE Infocom 2004, 21 pages, Mar. 7, 2004.
Andy Currid; "TCP Offload to the Rescue," ACM Queue, vol. 2, No. 3, pp. 58-65, May 1, 2004.
Greg Regnier, et al.; "TCP Onloading for Data Center Servers," Computer, IEEE Computer Society, vol. 37, No. 11, pp. 48-58, Nov. 2004.
Gregory L. Chesson; "Declaration of Dr Gregory L Chesson in *Alacritech* v. *Microsoft*," United States District Court, Northern District California, San Francisco Division, 289 pages, Feb. 4, 2005.
Edward D. Lazowska, David A. Patterson; "Computing Research: A Looming Crisis," ACM Computer Communication Review, vol. 35, No. 2, 2005, pp. 65-68, Jul. 2005.
W. Feng, et al.; "Performance Characterization of a 10-Gigabit Ethernet TOE," Proceedings of the 13th Symposium on High Performance Interconnects, pp. 1-6, Aug. 17, 2005.

B. Leslie, et al.; "User-level device drivers: Achieved performance," J. Comput. Sci. & Technol., vol. 20, pp. 1-17, Sep. 2005.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
Humaira Kamal, et al.; "SCTP versus TCP for MPI," Proceedings of the 2005 ACM/IEEE conference on Supercomputing, Seattle, Washington, 14 pages, Nov. 12, 2005.
Sumitha Bhandarkar, et al.; "LTCP: Improving the Performance of TCP in Highspeed Networks," ACM Computer Communication Review, vol. 36, No. 1, pp. 41-50, Jan. 2006.
H. K. Jerry Chu; "Zero-Copy TCP in Solaris," Proceedings of the USENIX Annual Technical Conference, 13 pages, Jan. 1996.
Ken Calvert; "Reflections on Network Architecture: an Active Networking Perspective," ACM Computer Communication Review, vol. 36, No. 2, pp. 27-30, Apr. 2006.
Jon Crowcroft; "10 Networking Papers: Recommended Reading," ACM Computer Communication Review, vol. 36, No. 2, pp. 31-32, Apr. 2006.
Greg Minshall, et al.; "Flow labelled IP over ATM: design and rationale ," ACM Computer Communication Review, vol. 36, No. 3, pp. 79-92, Jul. 2006.
David Wetherell; "10 Networking Papers: Readings for Protocol Design," ACM Computer Communication Review, vol. 36, No. 3, pp. 77-78, Jul. 2006.
Patrick Geoffray; "A Critique of RDMA," HPCWire article: http://www.hpcwire.com/features/17886984.html, 7 pages, Aug. 18, 2006.
Jose Carlos Sancho, et al.; ".Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Steven Pope, David Riddoch; "10Gb/s Ethernet Performance and Retrospective," ACM Computer Communication Review, vol. 37, No. 2, pp. 89-92, Mar. 19, 2007.
Kieran Mansley, et al.; "Getting 10 Gb/s from Xen," Euro-Par Conference 2007, Rennes, France, 10 pages, Aug. 28, 2007.
M. Kaiserswerth; "The Parallel Protocol Engine," IEEE/ACM Transactions in Networking vol. 1, Issue 6, pp. 650-663, Dec. 1993.
Danny Cohen, et al.; "Use of message-based multicomputer components to construct gigabit networks," ACM Computer Communication Review, vol. 23, No. 4, p. 32-44, Jul. 1993.
J. Evans and T. Buller; "The End of History," IEEE TCGN Gigabit Networking Workshop, 10 pages, Apr. 22, 2001.
M.V. Wilkes and R.M. Needham; "The Cambridge Model Distributed System," ACM SIGOPS Operating Systems Review, vol. 14, Issue 1, pp. 21-29, Jan. 1980.
Geoffray, P., "Protocol Off-Loading vs On-Loading in High-Perfomance Networks," Hot Interconnects 2006, 14th Symposium on High Performance Interconnects, Aug. 23, 2006, 5 pages.
Dickman, L., "Protocol OffLoading vs OnLoading in High Performance Networks," Hot Interconnects Panel, 14th Symposium on High Performance Interconnects, Aug. 23, 2006, 7 pages.
Petrini, F., "Protocol Off-Loading vs On-Loading in High-Performance Networks," Hot Interconnects 2006, 14th Symposium on High Performance Interconnects, Aug. 23, 2006, 4 pages.
Reginer, G., "Protocol Onload vs. Offload," Hot Interconnects 2006, 14th Symposium on High Performance Interconnects, Aug. 23, 2006, 1 page.
Montry, G., "Open Fabrics Alliance," www.openfabrics.org, Hot Interconnects 2006, 14th Symposium on High Performance Interconnects, Aug. 23, 2006, 8 pages.
U.S. Appl. No. 14/248,082—Notice of Allowance dated Apr. 8, 2014, 9 pages.

* cited by examiner

LOCKED DOWN NETWORK INTERFACE

CROSS REFERENCE TO OTHER APPLICATIONS

This application claims the benefit of prior U.S. Provisional Patent Application No. 61/809,777, filed 8 Apr. 2013, entitled "KILL SWITCH," by Steve L. Pope et al., which application is incorporated herein by reference in its entirety.

BACKGROUND

This application relates to a logic device for enforcing financial compliance rules and to a network interface device adapted to support such a logic device.

Recent years have seen a marked increase in automated trading on stock markets to the extent that, today, almost all financial trading has been computerised and trade execution automated with even the most basic trades being algorithmically assisted. Hand in hand with computerisation has been a huge increase in the speeds at which trading algorithms operate and the frequency at which the algorithms trade on the markets. This has led to somewhat of a technological arms race between market participants.

Very high trading speeds are now required in order to respond in a timely manner to market data and execute trades without being outperformed by other dealers who are able to trade at a shorter timescale. Market data can include the baseline data reported by the financial exchange in its data feeds, such as the buy and sell price of securities, as well as the trades and offers of other participants in the market. Responses to market data may also be required in order to provide a number of fundamental market functions, including acting as a market maker and maintaining a position in the exchange's book, and discovering liquidity and prices.

For all of these reasons, trading engines are increasingly being connected directly to exchange market data feeds and the algorithms themselves are largely required to operate autonomously. In order to react, process and trade within very short timescales (often under 10 microseconds) these algorithms simply do not have time to communicate internally with other computer systems, or even with other threads on the same machine. These timescales makes it difficult to effectively monitor and control the algorithms and all but rules out human intervention as a useful way of preventing dangerous trading behaviour. At scale, managing these trading engines becomes even more problematic, particularly tracking the position of a particular algorithm, assessing risk, and controlling an algorithm that has breached risk boundaries or is otherwise exhibiting erroneous behaviour. The penalty for failure to manage trading engines can be catastrophic to the trading enterprise and to the market, as demonstrated in August 2012 by the rapid trading disruption caused by Knight Capital's automated trading activities.

There is therefore a need for a mechanism by which risk boundaries can be enforced for high-speed trading engines.

Concerns about the ingress and egress data flows to and from a network entity may extend beyond trading applications. For example a server on a network may become compromised and may send out malicious or erroneous messages to other end-points on a network. In another example, a network entity may receive compromised communications from further network entities or endpoints which may affect the functionality of the receiving network entity. Therefore the trustworthiness of communications to and from an entity on a network may also be of concern.

SUMMARY

According to a first aspect, there is provided a logic device for intercepting a data flow from a network source to a network destination, the logic device comprising: a data store holding a set of compliance rules and corresponding actions; a packet inspector configured to inspect the intercepted data flow and identify from the data store a compliance rule associated with the inspected data flow; and a packet filter configured to when the data flow is identified as being associated with a compliance rule, carry out an action with respect to the data flow corresponding to the compliance rule.

The compliance rules may be configured to ensure compliance of at one of said network source and network destination with allowed behaviour.

The packet inspector may be further configured to identify the compliance rule associated with the data flow by parsing the received data flow to determine a characteristic of that data flow.

A compliance rule may identify a characteristic within the data flow for which there is an associated action. The characteristic may identify a network destination for which there is an associated action. The associated action may be blocking a data flow directed to the network destination. The associated action may be allowing a data flow directed to the network destination to continue to be transmitted to the network.

The characteristic may be an identity of a network source for which there is an associated action. The associated action may be blocking a data flow received from the network source. The associated action may be allowing a data flow received from the network source to be sent to the network destination.

The characteristic may be an amount of data transferred for a data flow and the compliance rule indicates a limit of data that may be transferred for a data flow. The characteristic may be an identity of an application level request for which there is an associated action.

The associated action may be one of: allowing a data flow comprising the application level request to be transmitted to the network destination; blocking a data flow comprising the application level request; and rewriting the application level request in a data flow to a second application level request.

The associated action may be to redirect a data flow to further destination. The associated action may comprise duplicating at least part of the data flow and forwarding said duplicated at least part of the data flow to a further entity. The duplicated at least part of the data flow may form a message digest. The message digest may comprise at least time stamp information.

The data store may further comprise an interface configured receive updates to the compliance rules and associated actions from a further entity. The logic device may be further configured to authenticate an update from the further entity. The logic device may be further configured to at least one of encrypt and decrypt an update from the further entity. The update may be authenticated using at least one key accessible to the logic device. The update may be digitally signed.

The updates to the compliance rules may be received from a control engine. The control engine may be part of a data processing device comprising the logic device. The logic device may communicate with the control engine across a network. The logic device may form part of a network interface device. The network interface device and control engine may be configured to carry out a challenge response authentication protocol.

A rule update may comprise a rule indicating that the network interface device is not to accept further rule updates. The logic device may refuse further rule updates in response to a rule update indicating that further rule updates are to be rejected.

The logic device may perform protocol processing. The logic device may perform protocol processing on a data flow to determine the characteristic. The logic device may perform protocol processing on an encrypted data flow. The logic device may perform SSL (secure sockets layer) protocol processing. The logic device may perform upper layer network protocol processing. The logic device may perform upper layer network protocol processing to determine a characteristic of the data flow in accordance with the compliance rule.

The data store may be further configured to store state information and the packet inspector is configured to identify from the data store a compliance rule associated with the inspected data flow based at least partially on the state information. The logic device may be a reconfigurable hardware device. The logic device may be a FPGA.

The network source may be a first virtual operating system and the network destination may be a second virtual operating system the first and second virtual operating systems being supported by a data processing system. The network source and the network destination may be configured to communicate over a network. The network source and the network destination may be network end-points.

According to a second aspect, there may be provided a network interface device for communicating between a data processing system and a network, comprising: the logic device of the first aspect.

According to a third aspect, there is provided a method comprising: intercepting a data flow from a network source to a network destination; storing a set of compliance rules and corresponding actions; inspecting the intercepted data flow and identifying from the data store a compliance rule associated with the inspected data flow; and when the data flow is identified as being associated with a compliance rule, carrying out an action with respect to the data flow corresponding to the compliance rule.

The method may further comprise: identifying the compliance rule associated with the data flow by parsing the received data flow to determine a characteristic of that data flow.

The method may further comprise: identifying a characteristic within the data flow for which there is an associated action. The characteristic may identify a network destination for which there is an associated action.

Carrying out an action with respect to the data flow may comprise blocking a data flow directed to the network destination. Carrying out an action with respect to the data flow may comprise allowing a data flow directed to the network destination to continue to be transmitted to the network. The characteristic may be an identity of a network source for which there is an associated action. Carrying out an action with respect to the data flow may comprise blocking a data flow received from the network source. Carrying out an action with respect to the data flow may comprise allowing a data flow received from the network source to be sent to the network destination.

The characteristic may be an amount of data transferred for a data flow and the compliance rule indicates a limit of data that may be transferred for a data flow. The characteristic may be an identity of an application level request for which there is an associated action.

Carrying out an action with respect to the data flow may comprise at least one of: allowing a data flow comprising the application level request to be transmitted to the network destination; blocking a data flow comprising the application level request; and rewriting the application level request in a data flow to a second application level request.

Carrying out an action with respect to the data flow may comprise redirecting a data flow to further destination. Carrying out an action with respect to the data flow may comprise duplicating at least part of the data flow and forwarding said duplicated at least part of the data flow to a further entity.

The method may further comprise: authenticating an update to the compliance rules from the further entity. The method may further comprise at least one of encrypting and decrypting an update to the compliance rules from a further entity. The method may further comprise: authenticating an update using at least one key accessible to the logic device. The method may further comprise digitally signing the update.

The method may further comprise: storing state information associated with the compliance rules; and identifying a compliance rule associated with the inspected data flow based at least partially on the state information.

According to a further aspect, there may be provided a logic device for enforcing financial compliance rules comprising: a first interface for receiving a flow of trade orders from a financial trading engine and a second interface for transmitting a filtered flow of trade orders onto a network; a data store holding a set of compliance rules and corresponding actions, each compliance rule expressing a predetermined trading pattern and each filter action specifying an action that is to be performed in response to the predetermined trading pattern being identified; a packet inspector configured to parse a received trade order and identify in the data store a compliance rule relating to the trade order; a matching engine arranged to match the identified compliance rule to the received trade order; and a packet filter configured to, in response to a match being found between the trade order and the identified compliance rule, perform the filter action corresponding to the identified compliance rule.

It will be appreciated that compliance rules may relate to any allowed network behaviour. It will also be appreciated that the compliance filter may intercept a trade order or other data flow.

The matching engine may be configured to, if the identified compliance rule expresses a trading pattern over a plurality of trade orders, cause the matching engine to maintain state for the compliance rule in the event that the received trade order does not match the compliance rule, the state being sufficient to allow the matching engine to identify when a subsequently received trade order matches the compliance rule.

The matching engine may be configured to maintain the state for the compliance rule at the data store. The matching engine may be configured to maintain as the state for the compliance rule data derived from predetermined values of the received trade order, the predetermined values being specified in the identified compliance rule.

The packet inspector may be configured to, on parsing the received trade order, form an abstraction of the trade order from one or more predetermined values of the trade order and use the abstraction to identify in the data store the compliance rule relating to the trade order.

The matching engine may be arranged to match the identified compliance rule to the received trade order by matching the identified compliance rule to the abstraction of the received trade order. The matching engine may be arranged to match the identified compliance rule to the received trade order by matching the identified compliance rule to the abstraction of the received trade order and state maintained for that compliance rule.

The abstraction may include one or more of the following values of the trade order: an identifier of the security to which the trade relates; a timestamp; an identifier of the type of trade; a value expressing the number of units involved in the trade; and a price specified in the trade.

Each trade order may be carried within a data packet that includes identifiers of a source network endpoint from which the trade order originates and a destination network endpoint to which the trade order is directed, the abstraction optionally including identifier(s) of one or both of the source and destination network endpoints.

The packet inspector may be configured to parse the received trade order by parsing one or both of a financial message representing the received trade order and headers of a data packet carrying the financial message. The packet inspector may be configured to identify the compliance rule in the data store using identifiers of source and/or destination network endpoints in the headers of the data packet.

The predetermined trading pattern expressed by the compliance rule may be a prohibited trading pattern and the corresponding filter action is to prevent the trade order being transmitted over the second interface. The predetermined trading pattern expressed by the compliance rule may be indicative of trade orders that exceed predefined trading limits and the corresponding filter action is one or more of: preventing the trade order being transmitted over the second interface; duplicating the trade order and causing a copy to be sent to a predefined network endpoint; redirecting the trade order to a predefined network endpoint.

The predefined trading limits may be, optionally with respect to a specified security only, one or more of: a trade order price range or value; a trade order price that differs from a specific reference price by a a maximum number of units; a maximum rate of change in price; a maximum rate at which trades are performed; a total value of trades that can be performed within a predetermined length of time.

The predefined trading limits may be a trade order price range or value and the trade order price range or value is dynamically set with respect to a specified market reference price.

The logic device may further comprise a command channel, the compliance filter being operable to dynamically update the set of compliance rules at the data store in response to commands received over the command channel. The command channel may be supported over the network and the compliance filter is directly responsive to network packets carrying commands that are received over the command channel from a control application.

The logic device may be further operable to block all trade orders from being transmitted over the second interface on receipt of a predefined control message over the control channel.

The compliance rule may define a list of approved securities to which trade orders are permitted to relate, and the corresponding filter action is to allow to be transmitted over the second interface only those trade orders that relate to security on the approved list. The first interface may be adapted to receive trade orders carried as payload of at least partially formed network data packets. The second interface may be a media access control unit configured to complete logical processing of the filtered network at least partially formed network data packets. The first and second interfaces may be one and the same interface.

According to a fifth aspect, there is provided a network interface device comprising: a controller; a physical layer unit for connection to a network; and a logic device as per any of the above aspects.

The logic device may be located on a network data path between the controller and physical layer unit.

BRIEF DESCRIPTION OF THE DRAWINGS

The present application will now be described by way of example with reference to the accompanying drawings, in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present application. Thus, the present application is not intended to be limited to the embodiments shown, but is to be accorded the widest scope consistent with the principles and features disclosed herein.

Figure 1:
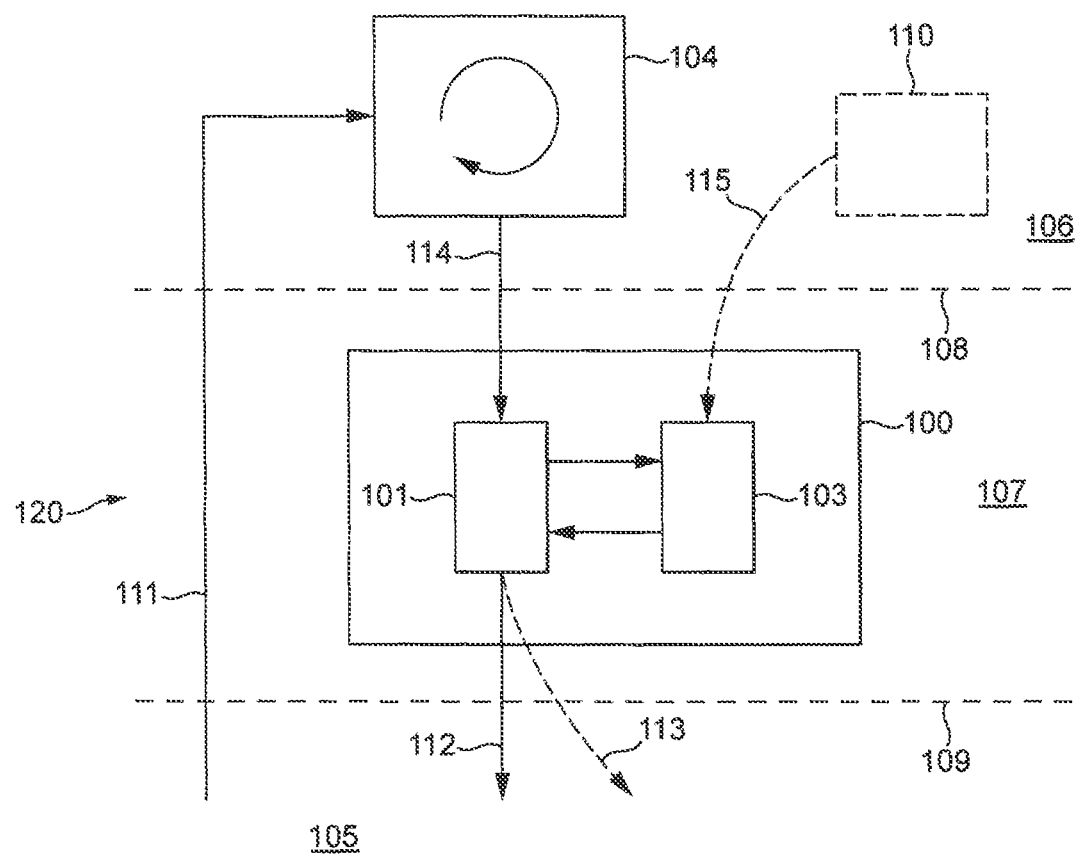
FIG. 1 is a schematic diagram illustrating flows of data within a data processing system configured in accordance with the present application.

A schematic diagram illustrating flows of data within a data processing system configured in accordance with the present application is shown in FIG. 1. The data processing system 120 comprises a trading engine 104 operable to receive financial information over one or more data feeds 111 (e.g. from a financial exchange) and in response generate trade orders 114 based on that information for transmission out onto a network 105. A compliance filter 100 is located between trading engine 104 and network 105 such that the data flows represented by trade orders 114 pass through the compliance filter for filtering prior to being transmitted over network 105.

In the example shown in FIG. 1, the data processing system is a computing device arranged to support a software trading engine 104 at user level. The compliance filter 100 is a hardware device arranged so as to perform in-line filtering of trade orders 114. Communication between the trading engine and compliance filter is performed over interface 108, which would typically be an API by means of which the trading engine can cause data to be transmitted to an endpoint on network 105, such as a financial exchange. Compliance filter 100 could be a reconfigurable logic device such as an FPGA, supported at a peripheral device 107 such as a network interface device.

On receiving trade orders 114, a processing module 101 of compliance filter 100 parses the incoming trade orders to identify patterns in the trade orders that match one or more predefined compliance rules stored in table 103. The table further indicates a corresponding action that is to be performed by the processing module on a match being identified to a compliance rule. Such compliance rules can be used to ensure that trade orders transmitted from the data processing system remain within predefined limits.

An action could for example cause the processing module to block the transmission of trade orders that match the stored rules. This could be useful to prevent trading engine 104 from exceeding predetermined trading limits. A control application 110 could be provided and configured to program the rules into table 103, as indicated by data flow 115.

By way of a first example, suppose trading engine 104 is trading on a security XYZ according to an automated trading algorithm and in response to financial data feeds 111 received over network 105 from a financial exchange. Since the trading engine can perform trades without manual intervention and at high speed, control application 110 is used to enter a set of rules into table 103 that express limits on the trades that can be placed by the engine. For instance, the rules might express a maximum number of buy orders that the engine is permitted to make on security XYZ within a predetermined period of time. Trade orders 114 are therefore examined at processing module 101 in accordance with the stored rules to check that the number of buy orders has not been exceeded for the trading period. Any trade orders that exceed the maximum number of buy orders could be discarded by the compliance filter and not transmitted in data flow 112 to the financial exchange accessible over network 105. Alternatively, those prohibited trade orders could be redirected over data flow 113 to a different endpoint (e.g. control application 110) so as to permit monitoring of the trade orders intended by the trading engine and without allowing those trade orders to be transmitted to the financial exchange. This can aid the debugging of trading algorithms whose behaviour triggers the rules of the compliance filter.

Figure 2:
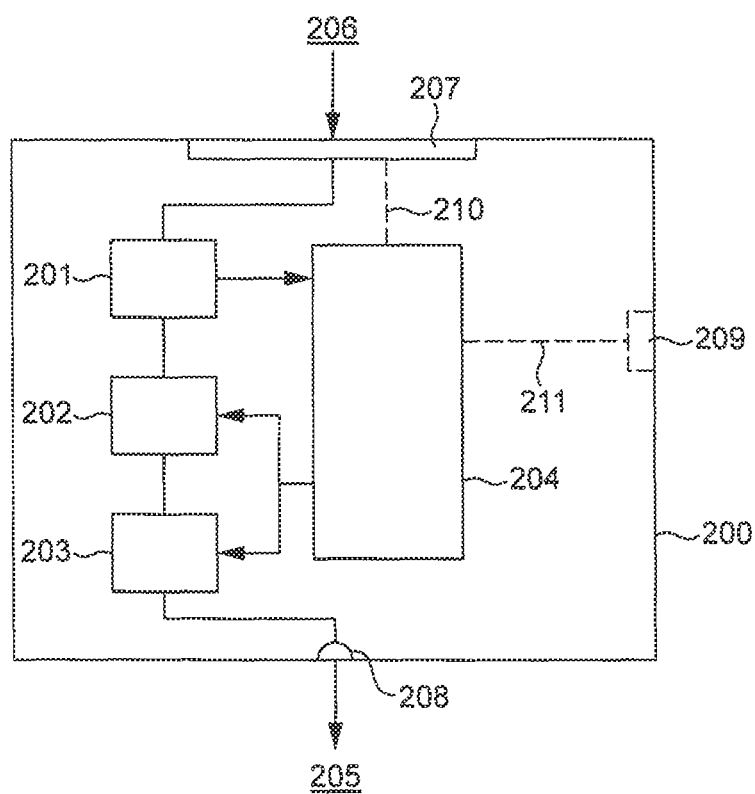
FIG. 2 is a schematic diagram of a reconfigurable logic device configured in accordance with the present application.

A compliance filter 200 configured in accordance with the present application is shown in FIG. 2. The compliance filter comprises a host interface 207 over which trade orders are received from a trading engine 206, and a network interface 208 over which trade orders permitted through the compliance filter are transmitted onto a network 205. The host and network interfaces could be one and the same—for example, the interfaces could be a network interface over which the trading engine is accessible, with trade orders being received at and transmitted from the compliance filter over that common interface. Compliance filter 200 is preferably a reconfigurable logic device, such as an FPGA.

The compliance filter comprises a packet inspector 201, a matching engine 202 and a packet filter 203. A data store 204 includes rules indicating patterns in the trade orders received from trading engine 206 and corresponding actions that are to be performed by the compliance filter on a pattern being identified.

Packet inspector 201 is arranged to parse incoming trade orders received over interface 207 so as to enable the relevant rules for each trade order to be identified in data store 204. Rules could be selected from data store 204 on the basis of any suitable identifiers of the received trade orders. Such identifiers could include one or more of a representation of a security to which the trade relates (e.g. a security symbol), a timestamp, an identifier of the type of trade (e.g. buy, sell, put, call etc.), a value expressing the number of units involved in the trade (e.g. a number of shares), and a price (e.g. an offer price for each unit or the trade as a whole). Different rules could be defined in data store 204 for different data flows from the trading engine. For example, different rules could be defined for each of the various securities traded by the trading engine, with the packet inspector being configured to identify a trading symbol from each trade order and the symbol being used as the basis of a lookup into the data store. Or, to give a second example, different rules could be applied to flows of trade orders directed to different endpoints (e.g. different financial exchanges, banks or market makers).

It is envisaged that multiple compliance rules could apply to a trade order. For example, a given trade order might relate to a particular security for which rules have been defined so as to catch predetermined trading patterns, as well as there being blanket rules that relate to all trades from a given trading engine.

Preferably the packet inspector is configured to perform a lookup into data store 204 on the basis of a predetermined set of trade order identifiers, which could be formed into an abstraction of each trade order. The abstraction could include any data from a trade order and/or data representing the source of the order (e.g. an identifier of the trading engine) and/or data representing the target for the order (e.g. an identifier of the remote financial exchange to which the order is directed). Data representing the source/target of an order would typically be included in the header of a data packet carrying that trader order.

In its simplest form a trade order abstraction could include part or all of a trade order message. In preferred embodiments, an abstraction could be derived from a set of predetermined values extracted from the respective trade order so as to form a data string representing the trade order in a format optimised for efficient lookup operations in the data store. It can be advantageous if data store 204 includes a lookup table and the abstractions are formatted so as to permit efficient lookup operations in that table. This allows the rules and corresponding actions relevant to a particular data flow (e.g. a stream of trade orders relating to a particular exchange or security) to be identified at low latency. The format of the abstraction generated for trade orders of a given data flow at packet inspector 201 could be specified in data store 204.

In the event that the abstractions formed at the packet inspector include all of the information necessary to identify the required pattern(s), the rules identified at data store 204 could be performed by the matching engine on the abstractions formed for the trade orders of a data flow, rather than on the trade orders themselves.

The rules stored in data store 204 that are identified by packet inspector 201 are used by matching engine 202 to identify patterns in the received trade orders that match predefined patterns expressed by those rules. Such pattern matching could be performed on a per-trade order basis or over multiple trade orders. State relating to a particular data flow of trade orders could be stored at data store 204 so as to allow patterns to be identified in a sequence of trade orders received from trading engine 206. On a predefined pattern being identified in a trade order/sequence of trade orders, packet filter 203 performs the action specified in the data store 204 that corresponds to the identified pattern.

Matching engine 202 could be configured to perform pattern matching in accordance with any suitable pattern matching algorithms.

Examples of patterns expressed by rules stored at data store 204 that matching engine 202 could be arranged to identify in individual trade orders received from trading engine 206 include:

a) values of trade order price that are outside a predetermined range for a particular security—e.g. rules could define a pattern as the buy price of a security XYZ exceeding a predetermined value;
b) values of trade order price that differ from a defined reference for a particular security—e.g. rules could define a pattern as the sell price of a security XYZ being more than 5% below a market reference, such as the sell price of that security at a financial exchange or market maker;
c) values expressing the number of units involved in a trade exceeding a predetermined number—e.g. rules could define a pattern as the number of shares of security XYZ being traded in a trade order exceeding 5000;
d) trade orders relating to securities that are not on an approved list of securities or that are not permitted to be traded—e.g. rules could define a list of approved securities that can be traded.

And examples of patterns expressed by rules stored at data store 204 that matching engine 202 could be arranged to identify over multiple trade orders received from trading engine 206 include:

a) changes in the price specified in a sequence of trade orders relating to a particular security exceeding a predetermined rate—e.g. rules could define a pattern as the sell price of a security XYZ dropping by greater than 5% (or a fixed amount) an hour;
b) changes in the price specified in a sequence of trade orders relating to a particular security exceeding a predetermined amount—e.g. rules could define a pattern as the buy price of a security XYZ rising by more than 1% (or a fixed amount) between trade orders;
c) the total number of units involved in trades relating to a particular security (possibly of a particular type) exceeding a predetermined rate—e.g. rules could define a pattern as the total number of shares being bought of a security XYZ exceeding 10000 an hour;
d) the total number of units involved in trades relating to a particular security (possibly of a particular type) exceeding a predetermined number within a given period of time—e.g. rules could define a pattern as the total number of shares bought of a security XYZ exceeding 100000 on a given trading day;
e) the total value of trade orders relating to a particular security, group of securities, type of security, or all securities exceeding a predetermined cap—e.g. rules could define a pattern as the total value of all shares bought on a trading day exceeding $10 million.

The above examples are merely illustrations of some of the patterns in trade orders for which the matching engine could be configured to identify. More generally, any kind pattern could be identified in trade orders, including combinations of the patterns set out in the above examples.

In order to perform rules that require patterns to be identified over multiple trade orders, the matching engine is configured to maintain state sufficient to allow the matching engine to perform such rules over a sequence of trade orders. The matching engine could be configured to store the state at data store 204. For example, if a rule causes the matching engine to monitor the total number of units bought of a particular security in received trade orders, the matching engine would maintain state identifying the total number of units bought of that security and update that state on receiving new trade orders for the purchase of further units of that security. This would allow the matching engine to identify when a predetermined cap has been reached (i.e. the pattern expressed by the rule) and to, in response, perform a corresponding action identified in the data store. Thus, for compliance rules that express trading patterns over more than one trade order, the matching engine is configured to match compliance rules using state stored for that compliance rule. Such compliance rules would preferably specify the values of trade orders from which the state is to be derived.

The rules defining the trading limits that are to be enforced by the compliance filter are written to data store 204 by a control application, which could be embodied in software or hardware (e.g. control application 110 in FIG. 1). A separate interface 209 could be provided to compliance filter 200 so as to permit control data to be communicated to data store 204 by means of link 211. This allows the control application to communicate with the data store without sharing the bandwidth of interface 207 with the trade orders and potentially introducing small delays into the transmission of the trade orders, which could be significant on high frequency trading platforms where latency is to be minimised. Alternatively, control data could be received over interface 207, with the interface preferably being configured to direct control data over link 210 and trade orders to packet inspector 201.

In alternative embodiments, a control application for the compliance filter could be located on a network. This could be network 205, with interfaces 208 and 209 being the same interface and control messages for the compliance filter being received over that common interface from the network. Or interface 209 could be distinct from interface 208 and connected to network 205 or another network. Whether the control channel (i.e. the path over which the compliance filter communicates with the control application) is a distinct or shared interface, it is preferably directly responsive to data packets carrying control data that are received over the network. This could require the compliance filter to perform at least some receive processing of network packets but ensures that control of the compliance filter can be performed at low latency.

The control application would typically be configured to update the rules at data store 204 as and when required in order to enforce the level of control required by the operator of the trading platform (i.e. the computer system supporting trading engine 206 and compliance filter 200). For example, the control application could update the rules at the data store before the relevant markets open each day. The control application could be configured to constantly update any rules that depend on dynamic market parameters, such as trading limits set with respect to data received over financial data feeds. In order to ensure that the parameters are maintained at low latency, such dynamic parameters in data store 204 could be updated by a component of the compliance filter itself—e.g. if the compliance filter is supported at a reconfigurable logic device then a firmware module could be defined to dynamically update rule parameters in response to data feeds received over network 205.

In response to matching engine 202 establishing a match to a pattern defined by the stored rules, packet filter 203 is configured to perform a corresponding action defined in data store 204. Examples of the actions that could be performed by packet filter 203 include:

a) discarding trade orders that match a defined pattern—e.g. on receiving a trade order that exceeds a trading cap on the total value that the trading engine is permitted to buy in a given trading day of a security XYZ, the compliance filter discards that trade order and all subsequent trade orders relating to the purchase of security XYZ;

b) blocking the transmission onto network 205 of trade orders that match a defined pattern and causing those trade orders to be directed to a different endpoint, such as a monitoring unit—e.g. on receiving a trade order whose price for a security XYZ represents a rate of change that exceeds a predetermined rate, the compliance filter redirects that trade order and all subsequent trade orders relating to that security to a control application so as to permit the application to continue to monitor the behaviour of the trading algorithm without necessarily allowing those trades to be performed at the financial exchange;

c) duplicating trade orders that match a defined pattern and causing those trade orders to be directed to a different endpoint, such as a monitoring unit—e.g. on receiving a trade order whose price for a security XYZ represents a rate of change that exceeds a predetermined rate, the compliance filter sends duplicates that trade order and all subsequent trade orders relating to that security to a control application so as to permit the application to monitor the behaviour of the trading algorithm at low latency;

d) redirecting trade orders that match a defined pattern to a different endpoint, such as a monitoring unit—e.g. on receiving a trade order whose price for a security XYZ represents a rate of change that exceeds a predetermined rate, the compliance filter sends redirects that trade order and all subsequent trade orders relating to that security to a control application so as to permit the application to determine whether those trade orders can be transmitted onto network 205.

It can be advantageous if an action is to be performed only on a certain type of trade order. For example, in response to a particular pattern of trades, the packet filter could be configured to discard all buy orders relating to a particular security but allow through any sell orders for that security such that the trading engine unwinds its holding of that security.

There could be multiple actions defined for a given flow of trade orders, the action being performed depending on which corresponding rule has been triggered. For example, a first rule could express a first trading limit which, when met, causes the packet filter to duplicate the data flow to a predefined endpoint at which a monitoring unit is located for monitoring the trades being performed by the trading engine. On a second trading limit expressed by a second rules being met by the trading flow, a corresponding action could be defined to terminate that data flow and discard all trades relating to that data flow received from the trading engine.

It can be useful if compliance filter 200 further provides a mechanism by which all or specified trading data flows originating at the trading engine can be rapidly terminated by a control application, for example in the event that the trading engine becomes unresponsive or exhibits erroneous behaviour. Further reasons why the compliance filter might terminate all trading flows include situations in which a raft of trading boxes are controlled simultaneously, or where trading needs to be halted for reasons that have not been caught by the compliance filter. A dedicated control command could be defined which, when provided to the compliance filter by a control application causes the compliance filter to block all or specified (e.g. in parameters of the control command) data flows from being transmitted onto network 205.

In the event that an action is triggered to cause trade orders to be redirected to a control application, it can in some circumstances (despite the additional latency) be advantageous to configure the control application to review the trade orders generated by the trading engine and determine whether those trade orders can be permitted onto network 205. The control application could perform this determination automatically by means of a set of algorithms, or the control application could permit manual intervention. Algorithms executed by the control application could be significantly more sophisticated than the rules performed by the compliance filter (the control application could be software supported at the host data processing system at which the trading engine and compliance filter are located).

It can be advantageous if one of the actions that the compliance filter is configured to perform in response to a rule being met is to cause a maximum trading frequency limit to be imposed on the trading engine. For example, the trading engine could cause a message to be transmitted to the trading engine to update a maximum trading frequency parameter held at the trading engine. Such a parameter could be held for each data flow of the system. The trading engine could cause a maximum trading frequency limit to be imposed on the trading engine by means of a control application as discussed above. The maximum frequency for a given data flow might be specified by the financial exchange with which the trades are being performed. As a backstop, rules could also be defined at the data store in accordance with the teaching herein so as to cause the compliance filter to identify data flows on which trade orders are being generated at a rate that exceeds a specified maximum trading frequency; in response the compliance filter would perform a corresponding action, such as preventing all trade orders of that data flow from being transmitted onto the network.

Compliance filter 200 is located between trading engine 206 and network 205 and configured to perform filtering of trade orders received from the trading engine in accordance with compliance rules at data store 204. In the example shown in FIG. 3, compliance filter 200 is provided at a reconfigurable logic device 300 that also supports trading engine 206. The trading engine and compliance filter could be separately defined by firmware installed at the reconfigurable logic device, with interface 207 representing a link by which trade orders are passed to the compliance filter. The reconfigurable logic device is preferably an FPGA, but could also be implemented using other technologies such as a Network Processing Unit, or Tiled array of processor cores.

In preferred embodiments of the present application, the compliance filter is configured to receive at interface 207 data packets comprising trade order messages formed at trading engine 206. The data packets are at least partially formed for transmission over network 207. Thus, packet inspector 201 is configured to parse received data packets in order to identify the payload trade orders carried therein and the rules at data store 204 applicable to each trade order. This could require the compliance filter to perform aspects of network protocol processing. For example, the compliance filter could be configured to ensure that the sequence numbers of data packets remain in order when trade orders are discarded, and the compliance filter could be configured to calculate or cause to be recalculated any checksums over data packets that comprise discarded or amended trade orders. In certain use scenarios, the compliance filter might be required to perform full termination of one or more network protocols such as TCP/IP, in addition to the messaging protocols in accordance with which the trade orders are formed, such as FIX or OUCH.

Rules at data store 204 might in fact operate over all or part of a data packet carrying a trade order. For example, rules might simply express a predefined rule that is to be applied to all trade orders received from a particular trading engine, e.g. from a particular source address and port in the case of an IP network.

By arranging the compliance filter close to the network such that it operates on at least partially formed network data packets carrying trade orders, the compliance filter can be used to perform in-line filtering of trade orders generated at high speed in hardware. The compliance filter is preferably further configured so as to parallelise its operations through pipelining and is configured to ensure very tight bounds on the jitter imposed by its operations. Interface 208 represents an interface to the network 205, and could include or represent a link to one or more logic and physical layer network protocol processing units required to effect the transmission of completed network data packets onto the fabric of network 205, such as a media access control unit (MAC) and physical layer unit (PHY).

Figure 3:
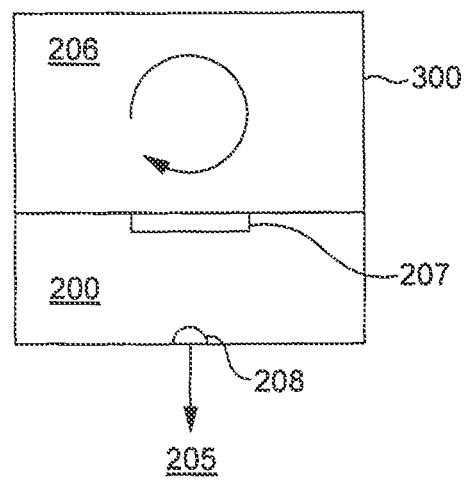
FIG. 3 is a schematic diagram of a reconfigurable logic device configured in accordance with the present application.

Interface 207 could be any kind of interface suitable to the architecture. For example, in the case that trading engine 206 and compliance filter 200 are firmware modules of a reconfigurable logic device (as shown in FIG. 3), interface 207 could be a logical link between those modules. In other examples, interface 207 could represent a physical connection or buffer between parts of an integrated circuit, discrete integrated circuits, or any other hardware (e.g. a data bus).

Figure 4:
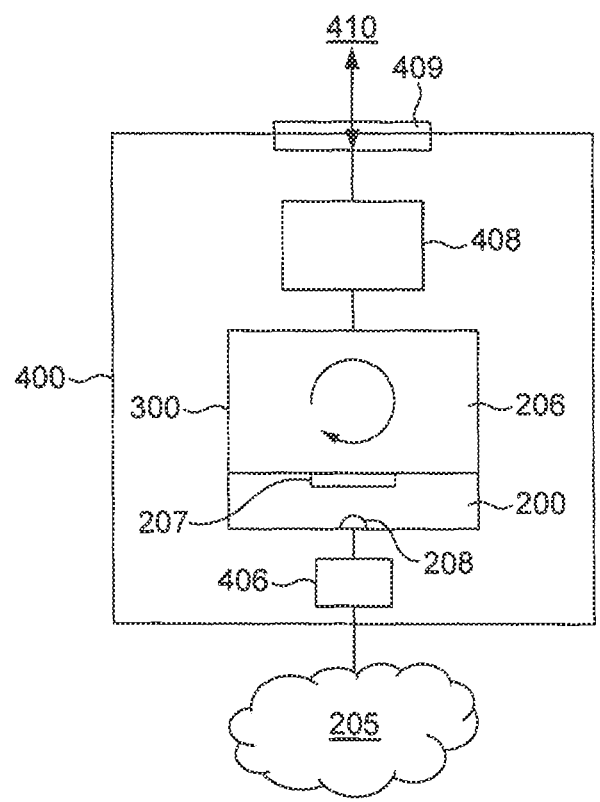
FIG. 4 schematic diagram of a network interface device comprising a reconfigurable logic device configured in accordance with the present application.

A particularly advantageous embodiment of the present application is shown in FIG. 4 in which compliance filter 200 and trading engine 306 are provided at a reconfigurable logic device 300 supported at a network interface device (MC) 400. The reconfigurable logic device is located between the controller 408 of the NIC and a PHY 406 by means of which network packets are transmitted onto network 205. The controller 408 is coupled to host computing device 410 by means of data bus 409. By positioning the trading engine and compliance filter on the network side of the NIC controller, the trading engine can trade at very low latency whilst the compliance filter provides a means of enforcing limits on those trades without significantly increasing their latency. In order to enable the trading engine to respond to incoming financial data feeds received over network 205 at low latency without traversing the host, the trading engine is arranged to at least partially perform protocol processing of network data packets: i.e. to extract data from feeds received from remote exchanges and to form data packets comprising trade orders generated in response at the trading engine.

Note that in all of the embodiments described herein the packet inspector 201, matching engine 202 and packet filter 203 schematically represent functionality of the compliance filter. The packet inspector 201, matching engine 202 and packet filter 203 need not be discrete units and could together be formed of one or more functional units. For example, the packet inspector 201 and matching engine 202 could be a single unit arranged to perform both parsing and pattern matching of trade orders. In the case that the compliance filter is a reconfigurable logic device, packet inspector 201, matching engine 202 and packet filter 203 could comprises one or more firmware modules configured to provide the functionality described herein. Alternatively the compliance filter could be implemented as non-deterministic finite state automata which are generated (compiled) from the set of compliance rules.

Various examples will now be described by way of illustration as to combinations of pattern matching and filtering actions that compliance filter 200 can be configured to perform.

In a first example, rules are maintained at data store 204 such as to cause packet inspector 201 to identify trade orders offering to sell a security XYZ at more than 5% below a market reference (e.g. the price offered by a given market maker). The packet inspector identifies this rule when it performs a lookup into the data store using symbol XYZ parsed from a received trade order that relates to the sale of XYZ. The rule is performed by the matching engine which compares the sell price in the trade order to the market reference value maintained at the data store. If a match is found (i.e. the sell price is more than 5% below the reference) the matching engine causes the packet filter to perform the corresponding action in data store 204, which in this case is to prevent that trade order from being transmitted over network 205.

In a second example, rules are maintained at data store 204 such as to cause packet inspector 201 to identify in a data flow of trade orders relating to security XYZ the sell price of a security XYZ dropping by greater than 5% an hour. The packet inspector therefore maintains state representing historical information as to the sell price offered for security XYZ. On a trade order being received, the packet inspector parses the trade order to identify the security to which it relates and performs a lookup using the symbol XYZ in the data store to find the corresponding rule. If the received trade order relates to the sale of security XYZ, the packet inspector identifies the above rule and passes it to matching engine 202 which examines the trade order against the historical price information and, when the pattern expressed by the rule is identified, causes the packet filter to perform the corresponding action defined in the data store. The action in this case is to redirect the trade order and all subsequent trade orders relating to that security to a control application running a sandbox exchange at which the trade orders can be safely performed and monitored. This redirection is achieved by modifying the destination address in the header of the data packet comprising the trade order in order to cause the data packet to be delivered to a network endpoint of the control application instead of to the intended financial exchange.

In a third example, rules are maintained at data store 204 such as to cause packet inspector 201 to identify across all data flows received from a trading engine (e.g. from a particular source address and port) when the total value of all shares bought on a trading day exceeds $10 million. This is achieved by arranging that the packet inspector maintain state representing a sum of the total value of all shares bought (the value being zeroed at the start of a trading day). On receiving a trade order the packet inspector parses the data packet carrying the trade order so as to identify the source address and port from which the packet originates. This information is used as a lookup into the data store in order to identify to the matching engine which rule is to be performed on trade orders from that trading engine. In this case the rule only results in the corresponding action being performed by the packet filter when the cap is exceeded (i.e. the rule is satisfied by a trade order from the trading engine), the action being to block all trade orders from that trading engine from being sent out over the network.

In the foregoing the data processing system is described as providing a compliance filter 100 between a trading engine 104 and a network 105. It will however be appreciated that the disclosure of the present application may extend beyond being restricted to the trading engine and checking of compliance for trading orders.

A compliance filter according to further embodiments of the application may be applicable to other applications requiring security. For example, a compliance filter may be provided to monitor the traffic of a network end-point and/or application other than a trading engine. The compliance filter may be used to configure a network interface to accept only data flows to/from nominated end-points, monitor and restrict network traffic and/or provide an audit trail for activity. Such a compliance filter may for example prevent unauthorized traffic from reaching a server. Additionally or alternatively a compromised server may be restricted from outputting damaging network traffic or distributing unauthorized content.

Figure 5:
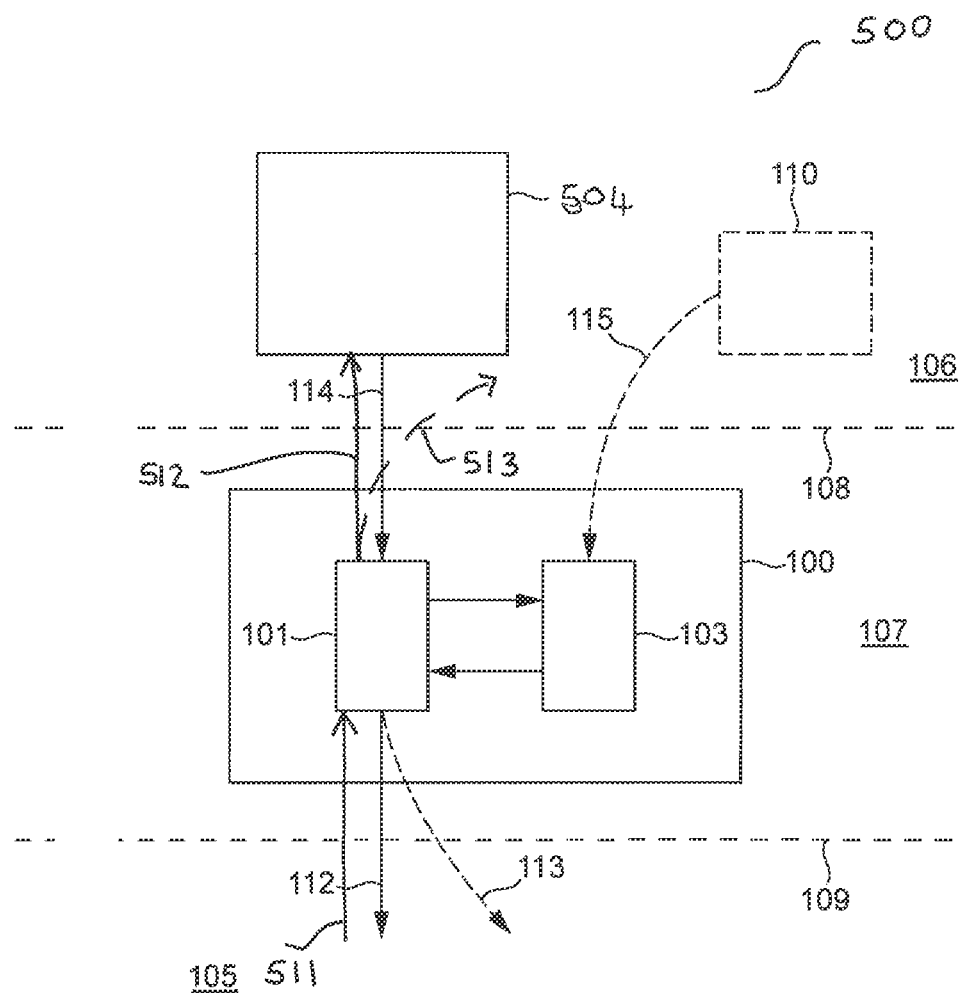
FIG. 5 is a schematic diagram illustrating the flows of data within a data processing system according to a further embodiment of the present application.

FIG. 5 shows an example of a data processing system 500 according to a further embodiment of the present application. It will be appreciated that the data processing system may be similar to that of the first embodiment and like reference numerals indicate like.

FIG. 5 shows a network 105, a peripheral device 107, for example a network interface device, supporting an interface 109 between the network 105 and a higher level of the network 106, for example a user or application layer. An interface 108 is provided between the application or user-level and the peripheral device.

In FIG. 5, interface 108 is shown between an application and/or user level and the peripheral device, however it will be appreciated that in some embodiments the application may be running in a different context. For example an application may be running in an operating system kernel context or as part of the hypervisor in a virtualized environment.

At the application layer there is provided an application or network end-point 504 that is configured to send and receive data over the network 105 via the peripheral device 107. The end-point 504 may for example be a server in some embodiments however it will be appreciated that the end-point may relate to other applications.

The peripheral device 107 may comprise a compliance filter 100 which may monitor the data sent to and received from the end-point 504 for security purposes. The compliance filter 100 may receive data to be transmitted over the network 114 from the end-point 504 and transmit data 512 received over the network to the end-point 504.

The compliance filter may further receive data 112 addressed to the end-point 504 over the network and transmit data 511 from the end-point 504 to the network. The compliance engine 100 may comprise a processing module 101 and a table 103.

In operation, the compliance filter 100 may intercept data destined to the end-point 504 from the network and intercept data destined to the network from the end-point 504. This intercepted data may be checked for compliance with rules that have been set at the compliance engine and the compliance engine may process the data accordingly.

Similarly to the embodiment of FIG. 1, data 114 destined to the network from the end-point 504 may be intercepted or received at the compliance filter 100. On receiving the data 114, a processing module 101 of compliance filter 100 may parse the incoming data 114 to identify patterns in the data 114 that match one or more predefined outgoing compliance rules stored in table 103. The table may further indicate a corresponding action that is to be performed by the processing module on a match being identified to a compliance rule.

An action could for example cause the processing module to block the transmission of data 114 that matches the stored rules. This could be useful to prevent a security compromised end-point 504 from sending out compromised or malicious data.

In addition to the data processing system of FIG. 2, the compliance filter 100 of FIG. 5 may further receive data 511 from the network 105 and destined to the end-point 504.

On receiving the data 511 from the network, the processing module 101 of compliance filter 100 may parse the incoming data 511 to identify patterns in the data 511 that match one or more predefined incoming compliance rules stored in table 103. The table may further indicate a corresponding action that is to be performed by the processing module on a match being identified to a compliance rule.

An action could for example cause the processing module to block passing the incoming data 511 that matches the stored rules onto the end-point 504. This could be useful to prevent malicious data or messages from reaching the end-point 504.

Additionally action may take place for both data incoming to the end-point 504 and outgoing to the network 105. For example, certain data for which a match is determined may be forwarded, or copied and forward to a further entity. This is shown for example by the dotted lines 513 and 113 of FIG. 5. This may for example allow a further entity to analyse the match, and/or take some corrective or preventative action regarding the security compromise.

In some embodiments, the data flow may be audited at the further entity. In this case, the data flow may continue on to its end destination as well as being provided to the further entity for recording and/or auditing.

It will be appreciated that while the table 103 has been described as comprising both outgoing and incoming compliance rules, one or more of these rules may be applicable to both incoming and outgoing data. Additionally, as described in relation to the first embodiment, the compliance filter 100 may carry out some protocol processing. In this case, the compliance filter 100 may additionally carry out incoming protocol processing in some cases.

Where the incoming or outgoing traffic is encrypted, the compliance filter may be required to decrypt the flows in order to apply the rules. With many common protocols, this would require the compliance filter to fully process (terminate) the encrypted flows, using for example protocols such as SSL. In doing so, the filter would be required to participate in key exchange with the remote endpoint in order to establish the flows. Optionally the filter may re-encrypt or compress the data which is to be passed onwards (to the host).

Similarly to the first embodiment, a control application 110 could be provided and configured to program the rules into table 103, as indicated by data flow 115.

Figure 6:
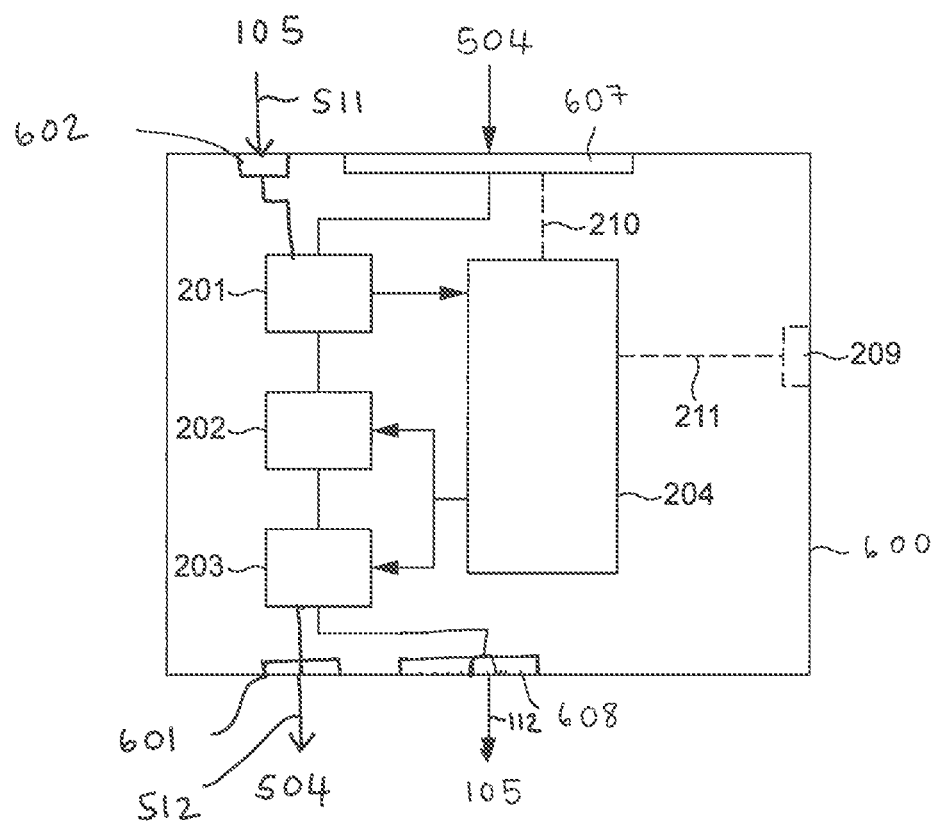
FIG. 6 is a schematic diagram of a reconfigurable logic device configured in accordance with a further embodiment of the present application.

FIG. 6 shows an example of a compliance filter 100 that may receive and filter data that is received from the network and destined to the end-point as well as being received from the end-point and destined to the network.

Similarly to the filter of FIG. 2, the compliance filter 600 of FIG. 6 comprises an ingress host interface 607 over which data is received from an end-point 504, and an egress network interface 608 over which data permitted through the compliance filter is transmitted onto a network 105.

Additionally, the compliance filter 600 comprises an ingress network interface 602 which may receive data from the network 105 addressed to the end-point 504 and an egress host interface 601 which may provide data 512 from the compliance filter 600 to the network 105.

The ingress host interface 607 and egress host interface 601 may form the same interface in some embodiments. The ingress network interface 602 and egress network interface 608 may form the same interface in some embodiments. Additionally, the host and network interfaces could be one and the same—for example, the interfaces could be a network interface over which the end-point 504 is accessible, with data being received at and transmitted from the compliance filter over that common interface. Compliance filter 600 is preferably a reconfigurable logic device, such as an FPGA.

The compliance filter comprises a packet inspector 201, a matching engine 202 and a packet filter 203. A data store 204 includes rules indicating patterns in the data received from network 105 and from the end-point 504 and corresponding actions that are to be performed by the compliance filter on a pattern being identified.

It will be appreciated that in this embodiment, packets from the network 105 and packets from the end-point 504 received at the compliance filter 600 may be similarly processed and checked for compliance against the rules stored in the data store 204. However, it will be appreciated that in this embodiment, the rules may not be specific to trading and may encompass further rules.

The operation of the compliance filter 600 of this embodiment may be similar to that of the compliance filter 200 of the first embodiment with the addition of filtering both incoming and outgoing data and it will be appreciated that the actions taken in response to a match in the filter being found as well as the compliance rules governing the compliance filter may be similar.

Examples of the actions that could be performed by packet filter 203 of the second embodiment include one or more of the following:
  a) discarding data (for example a data packet or message) that matches a defined pattern
  b) blocking the transmission onto network 205 of data that matches a defined pattern and causing that data to be directed to a different endpoint, such as a monitoring unit;
  c) blocking the transmission onto the endpoint 504 of data that matches a defined pattern and causing that data to be directed to a different endpoint or entity, such as monitoring unit;
  d) duplicating data that matches a defined pattern and causing that data to be directed to a different endpoint, such as a monitoring unit in addition to being sent to the network or end-point;
  e) redirecting data that matches a defined pattern to a different endpoint or entity, such as a monitoring unit—for example it may be useful to support the ability to mirror a data flow or set of data flows to an external audit device. The mirroring could be the entire packets or a digest and including hardware timestamps. The mirroring could be continuous or only for packets which have triggered a rule or for some packets prior to and post the triggering of a rule There could be multiple actions defined for a given data flow, the action being performed depending on which corresponding rule has been triggered. In some embodiments, the type of action may be dependent on a characteristic of the data, for example an end-point to which the data is directed.

It will also be appreciated that the rules applied for filtering data may be dependent on security characteristics and the security characteristics of the end-points/network entities to which the data is destined and/or received from.

Examples of the rules that could be programmed into the data store 204 of the second embodiment include one or more of the following:
  a) Explicitly allow or block traffic to/from particular hosts or subnets, this may be for example based on a security characteristic of a host or a subnet. For example some hosts/subnets may be known to be malicious.
  b) Limit the amount of data that can be transferred.
  c) Explicitly allow or block application level requests, for example based on an end-point which the request is addressed (e.g http://)
  d) Rewrite application level requests, for example requests to certain end-points may be rewritten to be directed to other end-points, for example a known malicious or security risk end-point request may be rewritten to a security end-point.
  e) Match against arbitrary regular expressions within packets—for example to execute the SNORT or other network intrusion prevention system rule set over all or nominated traffic flows.

In some cases where the application protocol is carried over a byte stream protocol like transmission control protocol (TCP), the rule compliance filter 100 may account for segmentation and out of order arrival of the network frames as part of the algorithm. In other cases, the rules may be matched against each network frame.

The data processing system 500 of FIG. 5 may optional include and/or be accessed by a control application 110 configured to program the rules into table 103, as indicated by data flow 115.

It will be appreciated that in some embodiments the control application may be present on a control device that may be external to the data processing system. In one embodiment the control engine may reside elsewhere on a network, for example at a security monitor and/or auditor. The control engine may run for example on a trusted host forming part of the network and/or at a switch.

In one example the control engine may run on the host of the data processing system. The control engine may be an application running on the host. The application may run in the user space in some embodiments and may run at the operating system as part of the kernel in some embodiments. Additionally in some cases the control application may run as part of a system management processor (BMC).

In other words, the control engine may form part of the data processing system or be part of and communicated with over the network. It will be appreciated that the control engine itself may receive further commands from elsewhere, for example a further network entity such as the output of a cluster of computers which is performing network threat analysis.

The rules may be programmed into the table and/or existing rules may be updated or removed. In one example, the updating of rules from the control engine may be made according to external information—for example databases (such as Norse) which are created from analysis of information gathered from the wide area. In another example, the updating the rules from the control engine 110 may be made according to locally available information—for example traffic flows (such as connection rates) observed at the local network interface card housing the compliance filter or at monitoring points located in the local data center.

The security of the process of providing rules to the data store may affect the integrity of the compliance filter. In one embodiment, rules may be written to the data store and the compliance filter may receive a command which instructs the filter to never accept new rule updates. In this case, the compliance filter may be considered very highly secure because the rules may never be tampered with.

In a further embodiment, the rules may be updated and/or written in a secure manner. For example, the compliance filter 100 may not operate in a trusted environment and authentication of updates from the control engine may be implemented. In some embodiments, the communication between the compliance filter 100 and the control engine 110 may be authenticated. In some embodiments, the control engine 110 communicates with the network interface card (NIC) on which the compliance filter is implemented.

In a first example, this authentication of the communication from the control engine 110 may be provided by the NIC containing a key stored in a tamper resistant manner (for example in read only memory (ROM) or non-volatile random access memory (NVRAM) on the silicon) and updates may only be accepted if they are verified by the NIC as being digitally signed by that key.

In a further example, a number of keys may be used, some only used by the manufacturer used to revoke or install new keys used to update the rules by customers. This would allow for each customer or by site to use their own digital signatures.

In a further embodiment, the NIC hardware may be provided as being tamper resistant. This is due to there being no diagnostic interfaces on the NIC which can be used to inject new firmware, any keys are stored in a manner that cannot be read and/or all firmware loads from external flash are also digitally signed.

The NIC firmware may further be able to participate in a digitally signed challenge-response authentication protocol. This would enable the external control engine 110 (or other such device) to prove that the NIC has not been physically replaced with another NIC. Here it is advantageous that the network packets for this protocol are sent over the primary network interface.

In some cases controlling the authentication of the process of writing the rules to the data store may satisfy security requirements of the system, however in some cases it may be desired to keep the rules themselves secret. For example, even though an untrusted entity may not write or modify the rules written to the data store, it may benefit from learning what the rules are in order to circumvent them. In this case, the rules may be encrypted rather than just signed.

It will be appreciated that any suitable encryption may be used. For example hash encryption such as the cryptographic hash functions SHA-512 may be implemented in which the NIC (and compliance filter) and control engine may share a key. For digital signing the RSA cryptosystem may be implemented for example by providing a public-private key pair. In a further or additional example the advanced encryption standard (AES) may be implemented for the message encryption of messages between the control engine and NIC (compliance filter).

An example application of the present embodiment will now be described. In this example, the present embodiment may be used to insulate the NIC from denial of service attacks. Denial of service attacks are attempts to make a server and/or network unavailable to the users of that server and/or network. This may be achieved by overloading the server and/or network with messages and requests.

In this example, traffic from particular hosts or subnets may be accepted but modified in such a manner as to reduce the effectiveness of the attacker whilst other action is being taken to remove the flows from the NIC ingress. In this case, the rules may be programmed to identify the particular host or subnet and an action may be associated therewith to modify the incoming data from the host or subnet. In another example, the traffic may simply be blocked to prevent it reaching its destination.

The compliance filter may receive data and filter the data to identify a match in the table. This match may correspond to a rule regarding a particular host or subnet, or for example a rule regarding a request rate that may be received from a particular host or subnet. An action associated with the rule and/or the identity of the sender may be carried out.

In one example the action may cause the matched data flows to be redirected to another server (or a sacrificial CPU on this server) which will handle them but very slowly and therefore without impacting traffic on the protected server.

In another example, the flows may be accepted, but transport level protocol manipulated in order to burden the attacker—for example to cause attacker to constantly retransmit data or continually timeout.

It will be appreciated that this may also be carried out by a NIC with respect to an end-point on its own host, if it is determined that a server or an end-point had been compromised. This may attempt to prevent any damage to other end-points communicating with the compromised host end-point and/or server.

In another example, the compliance filter may be implemented in a virtualized environment. A virtualized operating system may comprise a server executing multiple guest operating systems over a hypervisor. The guest operating systems may communicate with each other via a NIC. The communications between the guests may be checked that they comply with network security rules. In this case, the compliance filter may be implemented in the NIC with compliance rules governing the communication between the guest operating systems. In other words, the compliance rules will govern the allowed behavior of the guest operating system end-points.

The traffic between guest operating systems may pass through the NIC (for example PCI virtual functions of the NIC can be directly mapped into each guest allowing each guest to send packets to the NIC) and the compliance filter may implement the rule matching process. It will be appreciated that in this case, the data flow will not be directed to the network but rather from one guest operating system to another via the NIC. For example guest operating system transmit to NIC, data flow checked by compliance filter at the NIC, the NIC transmits the data flow to the further guest operating system. In this manner, the audit trail and all other features could be applied as they were in the communication between a host and a network via a NIC.

In the foregoing the compliance filter has been described as being implement as part of the NIC and/or as a programmable hardware such as an FPGA. It will further be appreciated that the compliance filter may alternatively be implemented with a CPU with dedicated hardware assistance, for example a hardware parser and hash lookup engine.

There may be some circumstances where the compliance filter or some aspects of the filter could be implemented in software running on the host itself. This would require both a trust model which accepted host software based security enforcement and a performance requirement which was within that of the CPUs available. One example of such a configuration could be a server for which the BIOS environment was running over a trusted hypervisor. In this case the hypervisor might contain the compliance filter (and receive updates via network side-band management to the server's management interfaces). In another case, the compliance filter could be implemented as an operating system component. In such cases, the level of trust of a host or operating system would be considered before such a deployment over a hardware deployment.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present application may consist of any such individual feature or combination of features. In view of the foregoing description it will be evident to a person skilled in the art that various modifications may be made within the scope of the application.

The invention claimed is:

1. An apparatus for managing a data flow over a network between at least one network source and at least one network destination, the apparatus comprising:
   processing circuitry configured to:
   identify, based on data from at least one packet of the data flow and from among a set of rules to regulate data flows, a rule that is applicable to at least some packets of the data flow, wherein the rule is associated with at least one action and one or more conditions that, when met, indicate that the at least one action is to be performed, wherein each of the at least some packets of the data flow comprises a payload comprising one or more values;
   identify, based on the rule, state information to be maintained for the at least some packets of the data flow to determine when the one or more conditions are met;
   in response to receiving each respective packet of a plurality of the at least some packets of the data flow, update the state information in dependence upon the one or more values of the payload of the respective packet, and
   determine whether the updated state information meets the one or more conditions, the one or more conditions comprising a threshold condition; and
   in response to determining that the updated state information meets the one or more conditions, trigger performance of the at least one action.

2. The apparatus of claim 1, wherein the rule is configured to ensure compliance of at least one of the at least one network source or the at least one network destination with allowed behaviour.

3. The apparatus of claim 1, wherein the processing circuitry is further configured to identify the rule associated with the at least some packets of the data flow by parsing the data flow to determine a characteristic of the data flow.

4. The apparatus of claim 1, wherein the rule identifies a characteristic within the at least some packets of the data flow for which there is an associated action.

5. The apparatus of claim 4, wherein the characteristic identifies a network destination for which there is an associated action.

6. The apparatus of claim 5, wherein the associated action comprises blocking a data flow directed to the network destination.

7. The apparatus of claim 5, wherein the associated action comprises allowing the at least some packets of the data flow directed to the network destination to continue to be transmitted to the network destination.

8. The apparatus of claim 4, wherein the characteristic comprises an identity of a network source for which there is an associated action.

9. The apparatus of claim 8, wherein the associated action comprises blocking the at least some packets of the data flow received from the network source.

10. The apparatus of claim 8, wherein the associated action comprises allowing the at least some packets of the data flow received from the network source to be sent to a network destination.

11. The apparatus of claim 4, wherein the characteristic is an amount of data transferred by the at least some packets of the data flow and the rule indicates a limit of data that may be transferred for the at least some packets of the data flow.

12. The apparatus of claim 4, wherein the characteristic is an identity of an application level request for which there is an associated action.

13. The apparatus of claim 12, wherein the associated action comprises at least one of:
   allowing at least some packets of a data flow comprising the application level request to be transmitted to a network destination;
   blocking at least some packets of a data flow comprising the application level request; or
   rewriting the application level request in at least some packets of a data flow to a second application level request.

14. The apparatus of claim 4, wherein the associated action comprises redirecting at least some packets of a data flow to a further destination.

15. The apparatus of claim 4, wherein the associated action comprises duplicating at least part of the data flow and forwarding said duplicated at least part of the data flow to a further entity.

16. The apparatus of claim 15, wherein the duplicated at least part of the data flow forms a message digest.

17. The apparatus of claim 16, wherein the message digest comprises at least time stamp information.

18. The apparatus of claim 1, further comprising an interface configured to receive updates to the set of rules and associated actions from a further entity.

19. The apparatus of claim 18, wherein the processing circuitry is further configured to authenticate an update from the further entity.

20. The apparatus of claim 18, wherein the processing circuitry is further configured to at least one of encrypt or decrypt an update from the further entity.

21. The apparatus of claim 19, wherein the update is authenticated using at least one key accessible to the processing circuitry.

22. The apparatus of claim 19, wherein the update is digitally signed.

23. The apparatus of claim 1, wherein the processing circuitry is further configured to:
   store the state information; and
   identify the rule that is applicable to the at least some packets of the data flow based at least partially on the stored state information.

24. The apparatus of claim 1, wherein the processing circuitry is a reconfigurable hardware device.

25. The apparatus of claim 1 wherein the processing circuitry comprises one or more of a field-programmable gate array (FPGA), a network processing unit, a network interface card, or a processor core.

26. The apparatus of claim 1 wherein the at least one network source is a first virtual operating system and the at least one network destination is a second virtual operating system, the first and second virtual operating systems being supported by a data processing system.

27. The apparatus of claim 1 wherein the at least one network source and the at least one network destination are network end-points.

28. A network interface device for communicating a data flow between a data processing system and a network, comprising:
processing circuitry configured to:
identify, based on data from at least one packet of the data flow and from among a set of rules to regulate data flows, a rule that is applicable to at least some packets of the data flow, wherein the rule is associated with at least one action and one or more conditions that, when met, indicate that the at least one action is to be performed, wherein each of the at least some packets of the data flow comprises a payload comprising one or more values;
identify, based on the rule, state information to be maintained for the at least some packets of the data flow to determine when the one or more conditions are met;
in response to receiving each respective packet of a plurality of packets of the data flow,
update the state information in dependence upon the one or more values of the payload of the respective packet, and
determine whether the updated state information meets one or more conditions, the one or more conditions comprising a threshold condition; and
in response to determining that the state information meets the one or more conditions, trigger the performance of the at least one action.

29. A method of managing a data flow over a network between at least one network source and at least one network destination, the method comprising:
identifying, based on data from at least one packet of the data flow and from among a set of rules to regulate data flows, a rule that is applicable to at least some packets of the data flow, wherein the rule is associated with at least one action and one or more conditions that, when met, indicate that the at least one action is to be performed, wherein each of the at least some packets of the data flow comprises a payload comprising one or more values;
identifying, based on the rule, state information to be maintained for the at least some packets of the data flow to determine when the one or more conditions are met;
in response to receiving each respective packet of a plurality of packets of the data flow,
updating the state information in dependence upon the one or more values of the payload of the respective packet; and
determining whether the updated state information meets one or more conditions, the one or more conditions comprising a threshold condition; and
in response to determining that the state information meets one or more conditions, triggering performance of the at least one action.

30. The method claim 29 wherein the rule is configured to ensure compliance of at least one of the at least one network source or the at least one network destination with allowed behaviour.

31. The method of claim 29, further comprising:
identifying the rule associated with the at least some packets of the data flow by parsing the data flow to determine a characteristic of the at least some packets of the data flow.

32. The method claim 29 further comprising identifying a characteristic within the at least some packets of the data flow for which there is an associated action.

33. The method of claim 32 wherein the characteristic identifies a network destination for which there is an associated action.

34. The method of claim 33 wherein triggering performance of the at least one action comprises blocking at least some packets of a data flow directed to the network destination.

35. The method of claim 33 wherein triggering performance of the at least one action comprises allowing at least some packets of a data flow directed to the network destination to continue to be transmitted to the network destination.

36. The method of claim 32 wherein the characteristic is an identity of a network source for which there is an associated action.

37. The method of claim 36 wherein triggering performance of the at least one action comprises blocking at least some packets of a data flow received from the network source.

38. The method of claim 36 wherein triggering performance of the at least one action comprises allowing at least some packets of a data flow received from the network source to be sent to a network destination.

39. The method of claim 32 wherein the characteristic is an amount of data transferred for at least some packets of a data flow and the rule indicates a limit of data that may be transferred for the at least some packets of the data flow.

40. The method of claim 32 wherein the characteristic is an identity of an application level request for which there is an associated action.

41. The method of claim 40 wherein triggering performance of the at least one action comprises at least one of:
allowing at least some packets of a data flow comprising the application level request to be transmitted to the network destination;
blocking at least some packets of a data flow comprising the application level request; or
rewriting the application level request in at least some packets of a data flow to a second application level request.

42. The method of claim 32 wherein triggering performance of the at least one action comprises redirecting at least some packets of a data flow to a further destination.

43. The method of claim 32 wherein triggering performance of the at least one action comprises duplicating at least part of the data flow and forwarding said duplicated at least part of the data flow to a further entity.

44. The method of claim 29 further comprising authenticating an update to the set of rules, wherein the update is received from a further entity.

45. The method claim 29 further comprising at least one of encrypting or decrypting an update to the set of rules, wherein the update is received from a further entity.

46. The method of claim 44 further comprising authenticating the update using at least one key.

47. The method of claim 44 further comprising digitally signing the update.

48. The method of claim 29 further comprising:
storing state information associated with the set of rules; and
identifying the rule that is applicable to the at least some packets of the data flow based at least partially on the state information associated with the set of rules.

49. The apparatus of claim 1, wherein the state information comprises an indication of a number of received data packets of the at least some packets of the data flow.

50. The apparatus of claim 49, wherein the one or more conditions comprise the number of data packets of the at least some packets of the data flow received within a predefined time period exceeding a threshold.

51. The apparatus of claim 1, wherein the state information comprises an indication of values held in the at least some packets of the data flow.

52. The apparatus of claim 51, wherein the one or more conditions comprise a difference in values between received data packets of the at least some packets of the data flow exceeding a threshold.

53. The apparatus of claim 51, wherein the one or more conditions comprise a sum total of values held in data packets of the at least some packets of the data flow exceeding a threshold.

54. The method of claim 29, wherein identifying the rule based on the data from the at least one packet comprises identifying the rule based on data from at least one header of the at least one packet.

55. The method of claim 29, wherein triggering performance of the at least one action comprises performing the at least one action.

56. The method of claim 29, wherein:
the one or more conditions comprise a first condition relating to a variable;
identifying the state information to be maintained comprises identifying the variable; and
updating the state information comprises updating a value of the variable in response to receiving each respective packet of the plurality of packets.

57. The method of claim 29, wherein:
the one or more conditions comprise a first condition relating to a pattern exhibited by multiple packets of the at least some packets of the data flow;
identifying the state information to be maintained comprises identifying one or more variables for which values of the one or more variables would indicate that a data flow exhibits the pattern; and
updating the state information comprises determining values of the one or more variables in response to receiving each respective packet of the plurality of packets.

58. The method of claim 29, wherein the identifying the rule, the identifying the state information, the updating, and the triggering are performed by at least one circuit of a network interface card.

59. The method of claim 58, wherein the at least one circuit is at least one field-programmable gate array (FPGA).

60. The method of claim 58, wherein:
the at least one circuit is at least one first circuit;
the network interface card comprises at least one second circuit arranged to generate payload data for packets to be communicated via the data flow; and
the method further comprises intercepting, with the at least one first circuit, packets of the intercepted data flow that are transmitted to the at least one second circuit and/or transmitted from the at least one second circuit.

61. The method of claim 58, wherein the at least one circuit is further arranged to generate payload data for packets to be communicated via the data flow.

62. The apparatus of claim 1, wherein updating, in response to receiving each respective packet of the plurality of packets of the data flow, the state information comprises determining whether to update the state information based on data from each of the at least some packets of the data flow.

63. The method of claim 29, wherein updating, in response to receiving each respective packet of the plurality of packets of the data flow following identifying of the rule, the state information comprises determining whether to update the state information based on data from each of the at least some packets of the data flow.

64. The method of claim 29, wherein updating the state information in response to receiving each respective packet of the plurality of packets comprises updating the state information in response to receiving each of the at least some of the data packets of the data flow.

65. The apparatus of claim 1, wherein each of the at least some packets of the data flow share a common characteristic that distinguishes them from other received packets.

66. The apparatus of claim 65, wherein the common characteristic comprises a common identifier.

67. The apparatus of claim 65, wherein the common characteristic comprises delivering a trade order relating to a particular security.

* * * * *